United States Patent
Adams et al.

(10) Patent No.: US 11,315,208 B2
(45) Date of Patent: Apr. 26, 2022

(54) CONCEPTUAL REPRESENTATION OF BUSINESS PROCESSES FOR CROSS-DOMAIN MAPPING

(75) Inventors: Gregory Adams, Ottawa (CA); Vadim Berestetsky, Maple (CA); Dorian Birsan, Toronto (CA); Allen Chan, Markham (CA); John Steinbacher, Aurora (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1612 days.

(21) Appl. No.: 12/842,350

(22) Filed: Jul. 23, 2010

(65) Prior Publication Data

US 2011/0066566 A1     Mar. 17, 2011

(51) Int. Cl.
  *G06Q 99/00*     (2006.01)
  *G06Q 10/06*     (2012.01)
(52) U.S. Cl.
  CPC ........... *G06Q 99/00* (2013.01); *G06Q 10/067* (2013.01)
(58) Field of Classification Search
  CPC .............................. G06Q 99/00; G06Q 10/067
  USPC .......................................................... 705/348
  See application file for complete search history.

(56) References Cited

U.S. PATENT DOCUMENTS

| | | | |
|---|---|---|---|
| 6,678,882 B1 * | 1/2004 | Hurley | G06F 8/315 717/121 |
| 7,149,734 B2 | 12/2006 | Carlson et al. | |
| 7,424,717 B2 | 9/2008 | Blevins | |
| 7,430,743 B2 * | 9/2008 | Watt | G06F 9/44526 717/173 |
| 7,472,374 B1 | 12/2008 | Dillman et al. | |
| 7,475,408 B2 * | 1/2009 | Alcazar | G06F 9/44526 709/200 |
| 7,546,575 B1 | 6/2009 | Dillman et al. | |
| 2001/0032092 A1 * | 10/2001 | Calver | 705/1 |

(Continued)

FOREIGN PATENT DOCUMENTS

| | | | |
|---|---|---|---|
| CA | 2419153 A1 | 3/2002 | |
| CA | 2504082 A1 | 12/2005 | |

(Continued)

OTHER PUBLICATIONS ip.iq.com NPL Search. (Year: 2021).*

(Continued)

*Primary Examiner* — Tan D Nguyen
(74) *Attorney, Agent, or Firm* — Cantor Colburn LLP; Randy Emilio Tejeda

(57) ABSTRACT

A computer-implemented method, system, and computer program product for cross-domain mapping between a business process modeler domain and an implementation domain are provided. The method includes accessing a business concept registry on a data storage device including business concepts with mapping for the business process modeler domain and the implementation domain. The method also includes creating a model with one or more of the business concepts interconnected to represent a business process in the business process modeler domain, and exporting the model from the business process modeler domain to the implementation domain according to the business concept mapping of the business concept registry.

7 Claims, 4 Drawing Sheets

(56) References Cited

U.S. PATENT DOCUMENTS

| | | | |
|---|---|---|---|
| 2002/0035495 A1* | 3/2002 | Spira | G06Q 10/04 705/7.36 |
| 2002/0128934 A1* | 9/2002 | Shaer | G06Q 10/087 705/14.4 |
| 2002/0169842 A1* | 11/2002 | Christensen | G06Q 40/02 709/206 |
| 2004/0078258 A1* | 4/2004 | Schulz | G06Q 10/06 717/104 |
| 2004/0083448 A1* | 4/2004 | Schulz | G06Q 10/06 717/101 |
| 2004/0098292 A1* | 5/2004 | Miller et al. | 705/8 |
| 2004/0138934 A1* | 7/2004 | Johnson et al. | 705/7 |
| 2004/0187089 A1* | 9/2004 | Schulz | G06Q 10/06 717/101 |
| 2005/0125449 A1* | 6/2005 | Wong | G06F 8/36 |
| 2005/0125450 A1* | 6/2005 | Wong | A47H 27/00 |
| 2005/0198100 A1* | 9/2005 | Goring | G06F 9/546 709/200 |
| 2006/0004845 A1* | 1/2006 | Kristiansen | G06F 8/38 |
| 2006/0026552 A1* | 2/2006 | Mazzitelli et al. | 717/101 |
| 2006/0036994 A1* | 2/2006 | Englefield | G06F 30/00 717/104 |
| 2006/0277089 A1* | 12/2006 | Hubbard | G06Q 10/06 705/7.13 |
| 2007/0005618 A1* | 1/2007 | Ivanov | G06Q 30/00 |
| 2007/0073567 A1* | 3/2007 | Challapalli | G06F 8/34 705/7.26 |
| 2007/0226196 A1* | 9/2007 | Adya | G06F 16/24539 |
| 2007/0245297 A1* | 10/2007 | Kuester | G06F 8/10 717/104 |
| 2007/0265895 A1* | 11/2007 | Moore | G06Q 10/06 705/70 |
| 2007/0288250 A1* | 12/2007 | Lemcke et al. | 705/1 |
| 2008/0127236 A1* | 5/2008 | Beisiegel | G06F 9/4425 719/331 |
| 2008/0294408 A1 | 11/2008 | Padmanabhan | |
| 2009/0172012 A1* | 7/2009 | Chellam | G06Q 10/06 |
| 2009/0199155 A1* | 8/2009 | Morris | G06Q 10/06 717/102 |
| 2009/0254572 A1* | 10/2009 | Redlich | G06Q 10/06 |
| 2010/0166004 A1* | 7/2010 | Wang | H04L 12/2809 370/401 |
| 2010/0281455 A1* | 11/2010 | Anand | G06F 8/24 717/104 |
| 2010/0293080 A1* | 11/2010 | Shah | G06F 8/34 705/34 |
| 2011/0066425 A1* | 3/2011 | Hudgins | G06F 17/278 704/10 |

FOREIGN PATENT DOCUMENTS

| | | | | |
|---|---|---|---|---|
| CN | 1550980 A | * | 12/2004 | G06F 9/451 |
| KR | 2016035731 | * | 4/2016 | |
| WO | WO-2004102436 A1 | * | 11/2004 | G06Q 10/06 |
| WO | WO2006042841 | * | 4/2006 | |
| WO | 2008018080 | | 2/2008 | |
| WO | 2008124156 A1 | | 10/2008 | |

OTHER PUBLICATIONS

GoogleScholar Search. (Year: 2021).*

Agnes Koschmider, Ontology Based Business Process Description, Jan. 2005, Conference Paper EMOI-INTEROP, pp. 1-12. (Year: 2005).*

Mutaz M. Al-Debei, "Developing a Unified Framework of the Business Model Concept", European Journal of Information Systems (2010) 19, 359-376. (Year: 2010).*

Beate List, An Evaluation of Conceptual Business Process Modelling Languages (BPMLs), Apr. 23-27, 2006, Proceedings of the 2006 ACM Symposium on Applied Science, pp. 1532-1539. (Year: 2006).*

* cited by examiner

CONCEPTUAL REPRESENTATION OF BUSINESS PROCESSES FOR CROSS-DOMAIN MAPPING

PRIORITY

This application claims priority to Canadian Patent Application No. 2679786, filed 16 Sep. 2009, and all the benefits accruing therefrom under 35 U.S.C. § 119, the contents of which in its entirety are herein incorporated by reference.

BACKGROUND

The present invention relates generally to computerized mapping of business process models into information technology implementations, and more specifically, to a conceptual representation of business processes for cross-domain mapping between a business process modeler domain and an implementation domain.

A service-oriented architecture (SOA) is a distributed computing and modular programming framework in which existing or new technologies are grouped into atomic systems. SOAs use software services to build applications. Services are relatively large, intrinsically unassociated units of functionality with externalized service descriptions. In an SOA environment, one or more services communicate with one another by passing data from one service to another, or coordinating an activity between one or more services. In this manner, atomic services can be orchestrated into higher-level services. The architecture defines protocols that describe how services can talk to each other, and independent services can be accessed without knowledge of the underlying platform implementation.

To implement an SOA solution, a tooling stack may be employed that is directed to different levels of abstraction between higher-level business processes and lower-level information technology implementation. Skills gaps often exist between business analysts responsible for modeling business processes and integration developers who deploy functional systems as implementations of the modeled business processes. For example, business analysts typically perform modeling tasks using model development systems, while integration developers perform integration tasks using integration development systems. Modeling systems may support exporting business process models as service component architecture (SCA) modules and corresponding business process execution language (BPEL) process implementations. However, the exported artifacts may be insufficient to meet particular customer needs and can be difficult to interpret relative to the original models as mapping information between domains is not readily available. Therefore, the business analysts may simply handoff the models as guidelines for integration developers to create integrated solutions from scratch rather than rely upon the exported artifacts from the modeling systems.

SUMMARY

An exemplary embodiment is a computer-implemented method for cross-domain mapping between a business process modeler domain and an implementation domain. The method includes accessing a business concept registry on a data storage device including business concepts with mapping for the business process modeler domain and the implementation domain. The method also includes creating a model with one or more of the business concepts interconnected to represent a business process in the business process modeler domain, and exporting the model from the business process modeler domain to the implementation domain according to the business concept mapping of the business concept registry.

Another exemplary embodiment is a system for cross-domain mapping between a business process modeler domain and an implementation domain. The system includes a host system with a processing circuit in communication with a data storage device configured to store a business concept registry. The system also includes a modeler application configured to execute upon the host system and access the business concept registry on the data storage device. The business concept registry includes business concepts with mapping for the business process modeler domain and the implementation domain. The modeler application is further configured to create a model with one or more of the business concepts interconnected to represent a business process in the business process modeler domain, and export the model from the business process modeler domain to the implementation domain according to the business concept mapping of the business concept registry.

A further exemplary embodiment is a computer program product for cross-domain mapping between a business process modeler domain and an implementation domain. The computer program product includes a storage medium readable by a processing circuit and storing instructions for execution by the processing circuit for implementing a method. The method includes accessing a business concept registry on a data storage device including business concepts with mapping for the business process modeler domain and the implementation domain. The method further includes creating a model with one or more of the business concepts interconnected to represent a business process in the business process modeler domain, and exporting the model from the business process modeler domain to the implementation domain according to the business concept mapping of the business concept registry.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments provide cross-domain mapping between a business process modeler domain and an implementation domain using a business concept registry. Business concepts allow mapping of artifacts between different abstraction levels from higher-level business process models to lower-level implementation. Multiple business concepts can be stored electronically in a business concept registry, where each business concept has corresponding artifacts defined in different domains, such as a business process modeler domain and an implementation domain. A business analyst may group and configure various business concepts in a modeler application to model and simulate a business process. The grouped business concepts and associated configurations are imported into integration development tools in order to generate a skeleton of an information technology (IT) solution based on the respective implementation in the implementation domain. The implementation domain may be defined using a service-component architecture (SCA) to support integration in a service-oriented architecture (SOA). The resulting structure in the implementation domain can be further modified using the integration development tools; however, the mapping to the original business process is maintained based on the structural correlation back to a set of initial business concepts.

Figure 1:
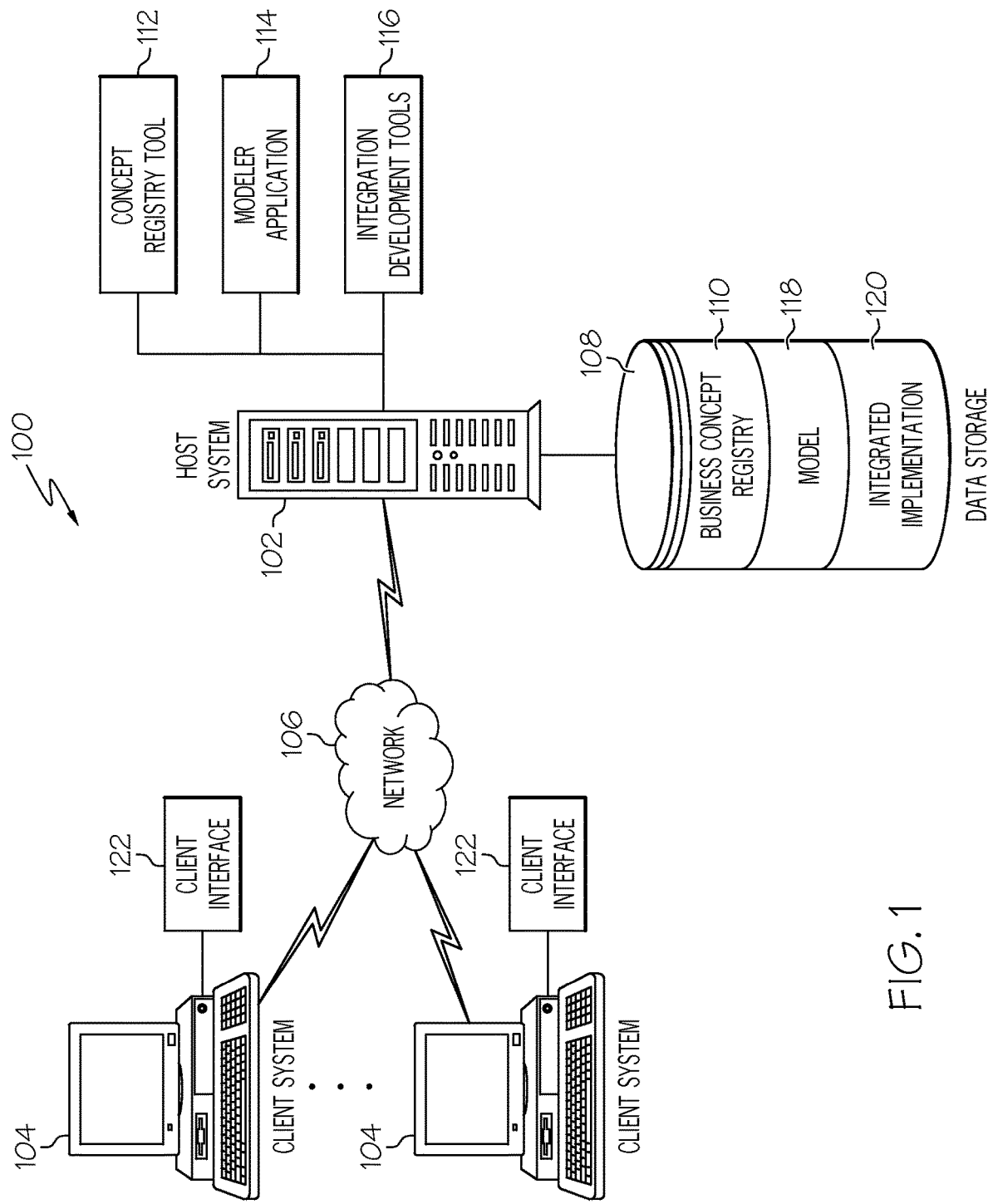
FIG. 1 depicts a block diagram illustrating an exemplary computer processing system that may be utilized to implement exemplary embodiments of the present invention.

Turning now to the drawings, it will be seen that in FIG. 1 there is a block diagram of a system 100 upon which cross-domain mapping between a business process modeler domain and an implementation domain is implemented in exemplary embodiments. The system 100 of FIG. 1 includes a host system 102 in communication with client systems 104 over a network 106. In exemplary embodiments, the host system 102 is a high-speed processing device (e.g., a mainframe computer, a desktop computer, a laptop computer, or the like) including at least one processing circuit (e.g., a CPU) capable of reading and executing instructions, and handling numerous interaction requests from the client systems 104 as a shared physical resource. For example, the host system 102 may enable the client systems 104 to access data storage device 108 in communication with the host system 102. The data storage device 108 may include a business concept registry 110 holding predefined business concepts that have associated artifact definitions in a business process modeler domain and an implementation domain.

In an exemplary embodiment, the host system 102 includes a concept registry tool 112 that can be used to access and update the business concept registry 110. The concept registry tool 112 may include an interactive editor to establish features and patterns of business concepts in the business concept registry 110. The concept registry tool 112 can be used to establish mapping information such that business concepts can be realized in both a business process modeler domain and an implementation domain, while maintaining cross-domain traceability. The host system 102 can also include a modeler application 114 and integration development tools 116. The modeler application 114 provides features to design and edit a model 118, which can be stored on the data storage device 108. The model 118 is a representation of one or more business processes defined with respect to business concepts in the business concept registry 110. The model 118 is constructed in a business process modeler domain, which is defined in higher-level business terms without low-level implementation details. The integration development tools 116 can create and modify an integrated implementation 120 corresponding to the model 118. The integrated implementation 120 is defined in an implementation domain that includes low-level implementation details.

Although the concept registry tool 112, modeler application 114, and integration development tools 116 are depicted on the host system 102, it will be understood that the concept registry tool 112, modeler application 114, and integration development tools 116 can be distributed across multiple computer systems. Moreover, a portion or the entire concept registry tool 112 can be integrated with the modeler application 114 and/or the integration development tools 116, for instance, as a plug-in.

In exemplary embodiments, the client systems 104 comprise desktop, laptop, general-purpose computer devices, and/or networked devices with processing circuits and I/O interfaces, such as a keyboard and display device (e.g., web-enabled phones or handheld devices). The host system 102 and client systems 104 can include various computer hardware and software technology known in the art, such as one or more processing units or circuits, volatile and non-volatile memory including removable media, power supplies, network interfaces, support circuitry, operating systems, and the like. Users can initiate various tasks locally on the client systems 104, such as interacting with the concept registry tool 112, modeler application 114, and/or integration development tools 116 through one or more client interfaces 122. Client interfaces 122 can access web pages or components and execute hypertext transfer protocol (HTTP)-enabled content. The HTTP-enabled content may include secure HTTP, such as HTTP over a secure socket layer (HTTPS). The client interfaces 122 may support other communication or transfer protocols known in the art. For example, the client interfaces 122 can be local applications that communicate via application programming interface (API) calls with the concept registry tool 112, modeler application 114, and/or integration development tools 116.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks. The host system 102 may also represent a cluster of computer systems collectively performing processes as described in greater detail herein.

The data storage device 108 refers to any type of computer readable storage medium and may comprise a secondary storage element, e.g., hard disk drive (HDD), tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102.

Figure 2:
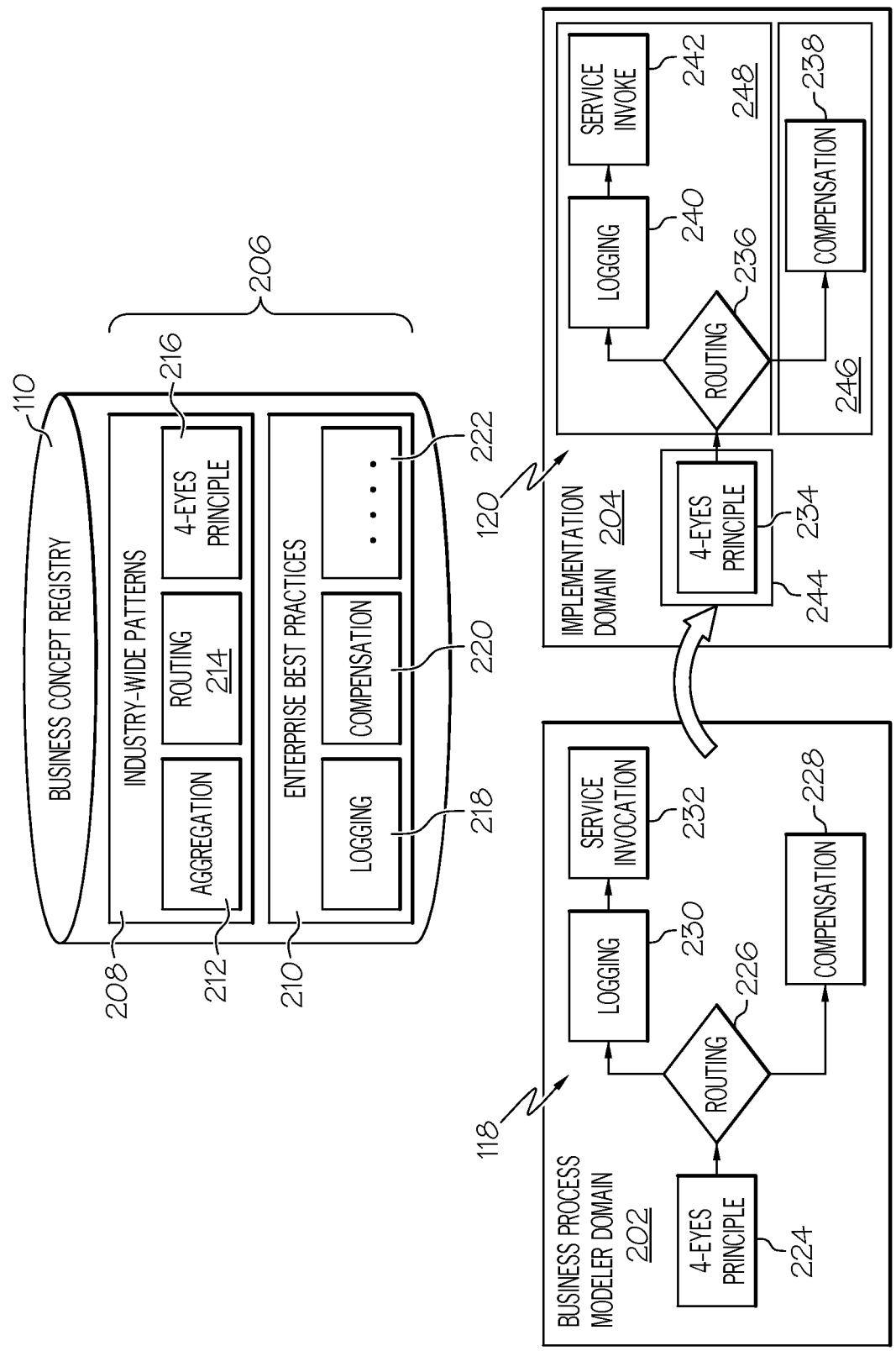
FIG. 2 depicts an example of a business concept registry, model, and integrated implementation in accordance with exemplary embodiments.

FIG. 2 depicts examples of the business concept registry 110, model 118, and integrated implementation 120 in accordance with exemplary embodiments. The business concept registry 110 provides mappings between business process modeler domain 202 and implementation domain 204. The business process modeler domain 202 is the environment in which modeler application 114 can operate, while the implementation domain 204 is the environment in which the integration development tools 116 of FIG. 1 operate. In order to ensure that models developed in the business process modeler domain 202 can be realized in the implementation domain 204, business concepts 206 are defined and stored in the business concept registry 110 that have established model definitions as well as implementation definitions.

The business concepts 206 may be partitioned into sub-categories, such as industry-wide patterns 208 and enterprise best practices 210. The industry-wide patterns 208 identify a number of reoccurring patterns used to solve various integration problems, such as aggregation concept 212, routing concept 214, and 4-eyes principle concept 216. Additional patterns known in the art for solving business problems can also be included in the industry-wide patterns 208. The enterprise best practices 210 can include customized best practices that are specific to a particular business unit or enterprise. Examples of enterprise best practices 210 include logging concept 218, compensation concept 220, and other proprietary concepts 222. The business concepts 206 include a number of variability points that enable developers to configure each pattern instance for their particular needs. The business concepts 206 include details that map to both the business process modeler domain 202 and the implementation domain 204 such that the business concepts 206 can be quickly realized and traceability can be established between domains 202 and 204.

A user, such as a business analyst, can use one of the client interfaces 122 of FIG. 1 to access the modeler application 114 and the business concept registry 110 to construct an instance of model 118 by grouping and configuring various aspects of available business concepts 206. The model 118 can also include additional concepts that are not defined in the business concept registry 110. For example, the instance of model 118 depicted in FIG. 2 includes 4-eyes principle model 224 coupled to routing model 226. The routing model 226 is connected to compensation model 228 and logging model 230. The logging model 230 is further coupled to service invocation model 232. In this example, the 4-eyes principle model 224 is an instance of the 4-eyes principle concept 216; the routing model 226 is an instance of the routing concept 214; the compensation model 228 is an instance of the compensation concept 220; and the logging model 230 is an instance of the logging concept 218. The model components 224-230 include configurable points of variability that are customized from the associated concepts 214-220, where the concepts 214-220 serve as modeling templates with known implementations. However, in this example, the service invocation model 232 does not have an associated business concept, and therefore represents a user-defined or customized model component for which a new implementation must be developed.

Once the model 118 is developed and tested, the model 118 can be passed to IT developers for implementation. Business concepts of the model 118 are imported into the implementation domain 204 creating implementations of the modeled concepts based on mapping defined in the business concept registry 110. The instance of the integrated implementation 120 depicted in FIG. 2 includes 4-eyes principle component 234 coupled to routing component 236. The routing component 236 is connected to compensation component 238 and logging component 240. The logging component 240 is further coupled to service invoke component 242. In this example, the 4-eyes principle component 234 is an implementation of the 4-eyes principle model 224; the routing component 236 is an implementation of the routing model 226; the compensation component 238 is an implementation of the compensation model 228; and the logging component 240 is an implementation of the logging model 230. The implementation components 234-240 include configured points of variability that are customized from the associated model components 224-230 and mapped according to the associated concepts 214-220. Since the service invocation model 232 does not have an associated business concept in the business concept registry 110, the service invoke component 242 is implemented as a shell to be populated with an implementation that aligns with modeled subcomponents of the service invocation model 232. The service invocation model 232 may include underlying business concepts that are part of the business concept registry 110, and corresponding implementations for those business concepts can be populated within the service invoke component 242.

The business concept registry 110 can include component grouping information to assist in mapping model components into implementation components as modules. For example, the 4-eyes principle component 234 can be partitioned into module 244, the compensation component 238 can be partitioned into module 246, while the routing component 236 and logging component 240 are clustered into module 248. In an exemplary embodiment, module partitioning is performed as a function of the definition language of the implementations and interface connectivity at boundaries between different implementation components. For example, components 234 and 238 may be implemented as business process execution language (BPEL) components, while components 236 and 240 are implemented as mediation flow components. Since the routing component 236 has a different implementation language and format than the 4-eyes principle component 234 and the compensation component 238 to which the routing component 236 is connected, this serves as a partition point between modules. Thus, even though the 4-eyes principle component 234 and the compensation component 238 are implemented as BPEL components in this example, the 4-eyes principle component 234 and the compensation component 238 are partitioned as separate modules 244 and 246 to maintain separate interfaces to the routing component 236. Furthermore, the routing component 236 and the logging component 240 are both implemented as mediation flow components in this example, allowing component grouping in module 248.

When model components are encountered during the mapping and conversion process that do not have an associated business concept, a message indicating this condition may be displayed. An integration developer may choose to use a mediation flow "service invoke" capability as service invoke component 242 to represent the service invocation model 232. Alternatively, the service invoke component 242 can also be initially included in module 248, as there is no associated definition and the only input is from the logging component 240 in module 248. Once a mapping and implementation are established between the service invocation model 232 and the service invoke component 242, the user may be presented with an option to update the business concept registry 110 to add a new business concept. Alternatively, the business concept registry 110 can be updated separately using the concept registry tool 112 of FIG. 1. The functionality that performs the mapping and partitioning into modules for the integrated implementation 120 can be incorporated as import logic in the integration development tools 116, as export logic of the modeler application 114, or as mapping and conversion logic of the concept registry tool 112.

Figure 3:
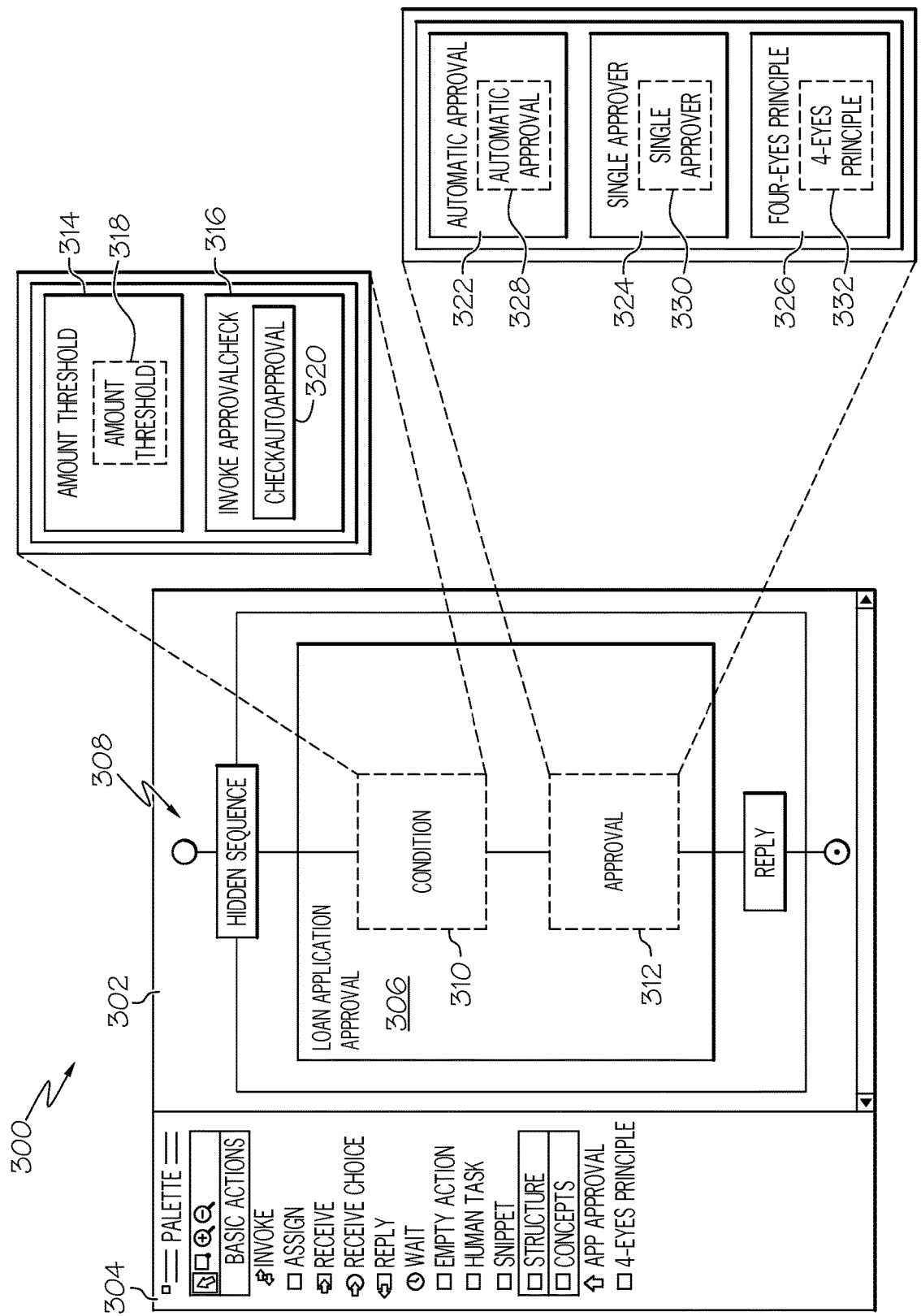
FIG. 3 depicts an example of a user interface to customize business concepts for business-specific models in accordance with exemplary embodiments.

FIG. 3 depicts an example of a user interface 300 to customize business concepts for business-specific models. The user interface 300 may be displayed on the client interface 122 of FIG. 1, with interactive commands and data passed to the modeler application 114. The user interface 300 includes a workspace 302 and a palette 304 to add and configure items in the workspace 302. The palette 304 can include links for selecting business concepts from the business concept registry 110 to create a customizable business process model. Business concepts can be defined in an embedded or recursive manner such that concepts can be defined within other concepts to construct higher-level patterns or concepts using one or more instances of other business concepts.

In the example of FIG. 3, a loan application approval business concept 306 has been added as part of a business process model 308. The loan application approval business concept 306 includes a number of configuration points that provide user flexibility to fine-tune concept behavior. In this case, the loan application approval business concept 306 includes a condition concept 310 coupled to an approval concept 312. The condition concept 310 includes options for an amount threshold 314 and an invoke approval check action 316. A user can select the amount threshold 314 and configure underlying amount threshold parameters 318, or the user can select the invoke approval check action 316 which invokes a check auto approval component 320.

The approval concept 312 includes multiple selectable approval options for customizing the business process model 308. For example, a user can select automatic approval 322, single approver 324, or four-eyes principle 326 (a second approver) within the approval concept 312. Configuration parameters can be set for automatic approval parameters 328, single approver parameters 330, and 4-eyes principle parameters 332. Each option defined as a business concept has an associated implementation for mapping to the implementation domain. Selection of specific implementation components to implement the condition concept 310 and the approval concept 312 depends upon the underlying options selected in developing the business process model 308.

A business analyst implementing the business process model 308 in the modeler application 114 can provide a set of configuration values for each business concept when business process model 308 is imported into the integration development tools 116 of FIG. 1. Equivalent configuration values for a corresponding implementation, such as integrated implementation 120, are populated to complete the import. Integration developers can update the configuration values to fine-tune the implemented solution in the implementation domain. Developers may also enhance the imported implemented solution using other features of the integration development tools 116. Since the primary structure of the implemented solution is provided upon importing, the mapping is maintained between the business process modeler domain and the implementation domain.

Figure 4:
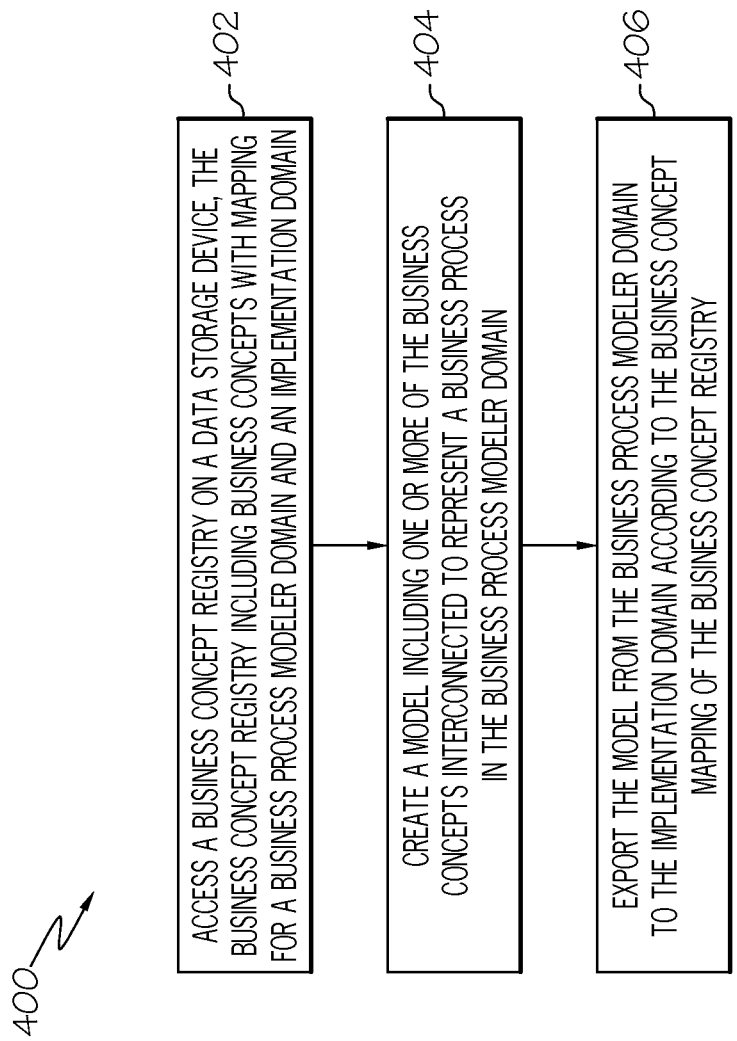
FIG. 4 depicts an exemplary process for cross-domain mapping between a business process modeler domain and an implementation domain using a business concept registry in accordance with exemplary embodiments.

Turning now to FIG. 4, a process 400 for cross-domain mapping between a business process modeler domain and an implementation domain using a business concept registry will now be described in accordance with exemplary embodiments, and in reference to FIGS. 1-3. At block 402, modeler application 114 accesses business concept registry 110 on data storage device 108. As previously described, the business concept registry 110 includes business concepts 206 with mapping for the business process modeler domain 202 and the implementation domain 204. The business concepts 206 may include industry-wide patterns 208 and enterprise best practices 210, which can include recursive definitions. The business concepts 206 also include multiple options with configurable points of variability for customization in the model 118.

At block 404, a user can access a user interface 300 via client interface 122 to create model 118 (or business process model 308) using modeler application 114, where the model 118 includes one or more of business concepts interconnected to represent a business process in the business process modeler domain 202. Further examples of interconnected business concepts in a model are depicted in FIGS. 2 and 3. The model 118 can incorporate one or more model components without a corresponding business concept 206 in the business concept registry 110, such as service invocation model 232.

At block 406, modeler application 114 exports the model 118 from the business process modeler domain 202 to the implementation domain 204 according to the business concept mapping of the business concept registry 110. The integration development tools 116 import the model 118 in the implementation domain 204 as integrated implementation 120 of components, such as components 234-240. The components are selected according to the business concept mapping of the business concept registry 110. If a model component does not have a mapping defined in the implementation domain 204, the modeler application 114 or the integration development tools 116 can notify the user that mapping is undefined for one or more components in the implementation domain 204. Alternatively, an implementation component shell can be created for the one or more model components in the model 118 without a corresponding business concept 206 in the implementation domain 204, such as service invoke component 242.

To build the integrated implementation 120, an implementation language is identified for each of the components in the implementation domain 204. The components are partitioned into modules, such as modules 244-248 at partitioning points. The partitioning points can be defined as language boundaries between the components, such as the interface between the 4-eyes principle component 234, the routing component 236, and the compensation component 238 of FIG. 2.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include using a business concept registry for cross-domain mapping between a business process modeler domain and an information technology implementation domain. The business concept registry stores high-level patterns with configurable lower-level concept options. The concepts include domain specific data that enables the concepts to be incorporated into a business process modeler domain of a modeler application and in an implementation space of integration development tools. Concepts can be grouped in the modeler application to form business process models, which can be imported into the integration development tools for implementation. Additional features added to the model that do not exist in the business concept registry can be passed to the integration development tools as a skeleton to maintain mapping and enable users of the integration development tools to populate design details consistent with the modeled structure.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A method using a business concept registry for cross-domain mapping between a business process modeler domain and an information technology implementation domain, the method implemented in a modeler application executable by a processor of a computing system, the processor coupled to a memory of the computing system, comprising:
   storing high-level patterns with a plurality of configurable lower-level business concepts in the business concept registry located on the memory, the plurality of configurable lower-level business concepts having respective mappings for the business process modeler domain and the information technology implementation domain;
   wherein each of plurality of configurable lower-level business concepts comprises domain specific data that enables incorporation into the business process modeler domain of the modeler application and in an implementation space of integration development tools;
   wherein the domain specific data comprises an industry-wide pattern, enterprise best practice, at least one recursive definition, and a plurality of options with configurable points of variability for customization in a model created by the modeler application;
   creating in the business process modeler domain, by the modeler application based on an input from a user via a user interface of a client interface, a model comprising the plurality of configurable lower-level business concepts interconnected to represent a business process in the business process modeler domain, the model comprising modelled components;
   wherein the modelled components comprise a first component that is not defined by a corresponding business concept from the plurality of the configurable lower-level business concepts of the business concept registry and a second component that is defined in the business concept registry;
   exporting, by the modeler application, the model from the business process modeler domain to the information technology implementation domain according to the respective mappings for the business process modeler domain and the information technology implementation domain;
   importing the model by an integration development tool in response to the exporting of the model by the modeler application and incorporating the second component as an integrated implementation of the modelled components selected according to the respective mappings;
   implementing, in the implementation domain, a service invoke component as a shell populated with an implementation aligned with the first component in the business process modeler domain; and
   implementing, in the implementation domain, an implementation domain component based on a mapping provided by the second component defined in the business concept registry.

2. The method of claim 1, wherein the importing of the model by the integration development tool comprises:
   notifying the user via the user interface that mapping is undefined for at least the first component in the implementation domain.

3. The method of claim 1, further comprising:
   updating the business concept registry with a new business concept corresponding to the first component.

4. A system, comprising a processor and a memory storing program instructions for cross-domain mapping between a business process modeler domain and an information technology implementation domain thereon, the program instructions executable by a processor to cause the system to perform:
   storing a plurality of configurable lower-level business concepts in a business concept registry located on the memory, the plurality of business concepts having respective mappings for the business process modeler domain and the information technology implementation domain;
   wherein each of plurality of configurable lower-level business concepts comprises domain specific data that enables incorporation into the business process modeler domain of the modeler application and in an implementation space of integration development tools;
   wherein the domain specific data comprises an industry-wide pattern, enterprise best practice, at least one recursive definition, and a plurality of options with configurable points of variability for customization in a model created by the modeler application;
   creating in the business process modeler domain, by the modeler application based on an input from a user via a user interface of a client interface, a model comprising the plurality of configurable lower-level business concepts interconnected to represent a business process in the business process modeler domain, the model comprising modelled components;
   wherein the modelled components comprise a first component that is not defined by a corresponding business concept from the plurality of the configurable lower-level business concepts of the business concept registry and a second component that is defined in the business concept registry;
   exporting, by the modeler application, the model from the business process modeler domain to the information technology implementation domain according to the respective mappings for the business process modeler domain and the information technology implementation domain;
   importing the model by an integration development tool in response to the exporting of the model by the modeler application and incorporating the second component as an integrated implementation of the modelled components selected according to the respective mappings;

implementing, in the implementation domain, a service invoke component as a shell populated with an implementation aligned with the first component in the business process modeler domain; and implementing, in the implementation domain, an implementation domain component based on a mapping provided by the second component defined in the business concept registry.

5. The system of claim 4, wherein the importing of the model by the integration development tool comprises:

notifying the user via the user interface that mapping is undefined for at least the first component in the implementation domain.

6. A computer program product, the computer program product comprising a non-transitory computer readable storage medium having program instructions for cross-domain mapping between a business process modeler domain and an information technology implementation domain embodied therewith, the program instructions executable by a processor to cause the processor to perform:

storing a plurality of configurable lower-level business concepts in a business concept registry located on the memory, the plurality of business concepts having respective mappings for the business process modeler domain and the information technology implementation domain;

wherein each of plurality of configurable lower-level business concepts comprises domain specific data that enables incorporation into the business process modeler domain of the modeler application and in an implementation space of integration development tools;

wherein the domain specific data comprises an industry-wide pattern, enterprise best practice, at least one recursive definition, and a plurality of options with configurable points of variability for customization in a model created by the modeler application;

creating in the business process modeler domain, by a modeler application based on an input from a user via a user interface of a client interface, a model comprising the plurality of configurable lower-level business concepts interconnected to represent a business process in the business process modeler domain, the model comprising modelled components;

wherein the modelled components comprise a first component that is not defined by a corresponding business concept from the plurality of the configurable lower-level business concepts of the business concept registry and a second component that is defined in the business concept registry;

exporting, by the modeler application, the model from the business process modeler domain to the information technology implementation domain according to the respective mappings for the business process modeler domain and the information technology implementation domain;

importing the model by an integration development tool in response to the exporting of the model by the modeler application and incorporating the second component as an integrated implementation of the modelled components selected according to the respective mappings;

implementing, in the implementation domain, a service invoke component as a shell populated with an implementation aligned with the first component in the business process modeler domain; and implementing, in the implementation domain, an implementation domain component based on a mapping provided by the second component defined in the business concept registry.

7. The computer program product of claim 6, wherein the importing of the model by the integration development tool comprises:

notifying the user via the user interface that mapping is undefined for at least the first component in the implementation domain.

* * * * *